United States Patent
Millner et al.

(10) Patent No.: US 9,534,264 B2
(45) Date of Patent: Jan. 3, 2017

(54) SYSTEM FOR ENERGY OPTIMIZATION IN A PLANT FOR PRODUCING DIRECT-REDUCED METAL ORES

(75) Inventors: Robert Millner, Loosdorf (AT); Gerald Rosenfellner, Ertl (AT); Harald Sprenger, Freistadt (AT)

(73) Assignee: PRIMETALS TECHNOLOGIES AUSTRIA GMBH (AT)

(*) Notice: Subject to any disclaimer, the term of this patent is extended or adjusted under 35 U.S.C. 154(b) by 283 days.

(21) Appl. No.: 14/241,610

(22) PCT Filed: Aug. 28, 2012

(86) PCT No.: PCT/EP2012/066662
§ 371 (c)(1),
(2), (4) Date: Feb. 27, 2014

(87) PCT Pub. No.: WO2013/037634
PCT Pub. Date: Mar. 21, 2013

(65) Prior Publication Data
US 2014/0217653 A1 Aug. 7, 2014

(30) Foreign Application Priority Data

Sep. 13, 2011 (AT) ................. A 1310/2011

(51) Int. Cl.
*C21B 13/00* (2006.01)
*C22B 1/00* (2006.01)
(Continued)

(52) U.S. Cl.
CPC ............. *C21B 13/00* (2013.01); *C21B 13/002* (2013.01); *F27D 17/004* (2013.01); *F27D 99/00* (2013.01);
(Continued)

(58) Field of Classification Search
CPC ........ C21B 13/00; F27D 17/004; F27D 99/00; C22B 1/00
See application file for complete search history.

(56) References Cited

U.S. PATENT DOCUMENTS 7,854,909 B2  12/2010  Zirngast et al.
7,931,731 B2   4/2011  Van Heeringen et al.
(Continued)

FOREIGN PATENT DOCUMENTS

AT  507525 A1  5/2010
AT  507713 A1  7/2010
(Continued)

OTHER PUBLICATIONS

Office Action dated Nov. 28, 2014 with Search Report in corresponding Chinese Patent Application No. 201280044523.5 (with English language translation)(12 pages).
(Continued)

*Primary Examiner* — Lois Zheng
(74) *Attorney, Agent, or Firm* — Ostrolenk Faber LLP (57) ABSTRACT

A system for energy optimization in a plant (3) for producing direct-reduced metal ores (3). The plant (3) has at least one reduction unit (12), a device for separating gas mixtures (7, 7a, 7b) having an associated compressing device (4, 4a, 4b), and a gas-heating device (10) upstream of the reduction unit (12). Part of the process gases (2, 2a, 2b) is fed by a feed line from a smelting reduction plant to the plant for producing direct-reduced metal ores (3). A turbine (8, 8a, 8b) is fit between the device for separating gas mixtures (7, 7a, 7b) and the gas-heating device (10) upstream of the reduction unit (12) such that a pressure drop between the device for separating gas mixtures (7, 7a, 7b) and the reduction unit (12) is converted into forms of energy that can be used to operate additional components (4, 4a, 4b, 15, 15a, 15b) of the plant (3), in particular electrical energy and/or mechanical energy. Energy consumption of the plant (3) is reduced.

9 Claims, 3 Drawing Sheets

(51) Int. Cl.
    *F27D 17/00*     (2006.01)
    *F27D 99/00*     (2010.01)

(52) U.S. Cl.
    CPC ........ *C21B 2100/02* (2013.01); *C21B 2100/04* (2013.01); *C21B 2100/06* (2013.01); *Y02P 10/122* (2015.11); *Y02P 10/126* (2015.11); *Y02P 10/128* (2015.11); *Y02P 10/136* (2015.11); *Y02P 10/265* (2015.11); *Y02P 10/283* (2015.11)

(56) References Cited

U.S. PATENT DOCUMENTS

| | | |
|---|---|---|
| 8,632,622 B2 | 1/2014 | Boehm et al. |
| 8,834,599 B2 | 9/2014 | Millner et al. |
| 2010/0162852 A1 | 7/2010 | Becerra-Novoa et al. |
| 2011/0283837 A1 | 11/2011 | Millner et al. |

FOREIGN PATENT DOCUMENTS

| | | |
|---|---|---|
| AT | 509224 A4 | 7/2011 |
| CN | 101755056 A | 6/2010 |
| CN | 102057060 A | 5/2011 |
| CN | 102203298 A | 9/2011 |
| EP | 0934904 A2 | 8/1999 |
| RU | 2298453 C2 | 5/2007 |
| WO | WO 2008146112 A1 | 12/2008 |
| WO | WO 2009037587 A2 | 3/2009 |
| WO | WO 2010020655 A1 | 2/2010 |

OTHER PUBLICATIONS

International Preliminary Report on Patentability dated Sep. 27, 2013 issued in corresponding International Patent Application No. PCT/EP2012/066662.
International Search Report dated Jan. 21, 2013 issued in corresponding International patent application No. PCT/EP2012/066662.
Russian Federation Decision on Grant dated Sep. 28, 2016 in corresponding Russian Patent Application No. 2014114497/02(022707) (total 8 pages).

FIG 3

SYSTEM FOR ENERGY OPTIMIZATION IN A PLANT FOR PRODUCING DIRECT-REDUCED METAL ORES

CROSS-REFERENCE TO RELATED APPLICATIONS

The present application is a 35 U.S.C. §§371 national phase conversion of PCT/EP2012/066662, filed Aug. 28, 2012, which claims priority of Austrian Application No. A1310/2011, filed Sep. 13, 2011, the contents of which are incorporated by reference herein. The PCT International Application was published in the German language.

BACKGROUND OF THE INVENTION

1. Technical Field

The invention relates to a system for energy optimization in a plant for producing direct-reduced metal ores, especially direct-reduced iron. In this case a plant for producing direct-reduced metal ores or metals, especially iron, has at least one reduction unit (e.g. fluidized bed reactor system, packed bed reduction shaft such as e.g. MIDREX® reduction shaft, etc.), a device for separating gas mixtures having an associated compressing device and a gas heating device arranged upstream of the reduction unit. The process gases necessary for producing direct-reduced metal ores are at least partly supplied via a feed line from at least one plant for pig iron production such as e.g. a smelting reduction plant and are possibly partly obtained by recycling from the production process itself.

2. Prior Art

The so-called direct reduction of metal ores or metals, especially of iron or iron oxide, to direct-reduced iron or sponge iron, is carried out for example in a separate plant—known as a direct-reduction plant. Such a plant for producing direct-reduced metal ores usually comprises at least one reduction unit such as a packed bed reduction unit for example, a fluidized bed reactor system, etc., depending on whether the metal ore to be reduced is present in lump or fine-particle form or is needed for further processing to pig iron, pig iron-like products or for steel production.

The material to be reduced (e.g. metal ore, iron ore, iron oxide, etc.) is introduced in direct reduction in lump form—e.g. as lump ore or pellets—or in fine particle granular form into the plant for producing direct-reduced metal ores including at least one reduction unit. A process gas, which is also referred to as reduction gas, then flows through the material in the reduction unit using what is known as the countercurrent principle. In this case the material is for example completely or partly reduced by the reduction gas—iron oxide is reduced for example to sponge iron—and the reduction gas is oxidized in this process. The material reduced in the reduction unit by the reduction gas then for example has a degree of metallization of around 45 to over 95%.

The process gases necessary for the reduction of the metal ores (e.g. reduction gas) are for example obtained in a melter gasifier in a smelter reduction method (z.B. COREX®, FINEX®, oxygen blast furnace, etc.) or in a coal gasifier. The reduction gas created for example in a melter gasifier is preferably at a temperature of 750 to 1000° C. and is mostly dust-retaining and also laden with carbon monoxide and hydrogen (e.g. with around 70 to 95% CO and $H_2$). The reduction gas is preferably introduced in the central to lower quarter of the reduction unit or in a fluidized bed reactor system, into the first fluidized bed reactor. It then rises upwards in the reduction unit and in a fluidized bed reactor system is conveyed from reactor to reactor and during this process reduces the material (e.g. metal ore, iron ore, iron oxide, etc.) in the countercurrent. The reduction gas is then tapped off from the reduction unit as so-called top gas or off gas.

Thereafter the reduction gas is cleaned in a gas cleaning device (e.g. gas washer) and possibly passed on as so-called recycle gas for removal of carbon dioxide $CO_2$ to a device connected upstream of the reduction unit for separation of gas mixtures with associated compressing device. Pressure adsorption systems such as e.g. Pressure Swing Adsorption (PSA), Vacuum Pressure Swing Adsorption (VPSA) are especially used as the system for separation of gas mixtures, since these systems are more cost-effective by comparison with other adsorption methods. After its treatment in the device for separation of gas mixtures the recycle gas can then be introduced again as reduction gas into the reduction unit.

As well as the part recycling of the process gas used in the plant for example, so-called export gas which is obtained for example from methods of pig iron production or from a melt reduction process such as the COREX® or FINEX® process for example, is used for the reduction process in the reduction unit. The term "export gas" is used in particular to designate that part of the so called top gas which is withdrawn from the melt reduction process or the method of pig iron production, cooled as a rule and also de-dusted (wet or dry), and possibly for further process gases such as for example surplus gas from the melter gasifier. In such cases the used reduction gas from a blast furnace, a melter gasifier or a reduction bed/packed bed reactor is usually referred to as top gas.

If the export gas from one or more melt reduction plants (e.g. plants based on the COREX®- and/or FINEX® process) is drawn off for the production of direct-reduced metal ores, then such a plant is referred to as a combined cycle plant. The export gas is introduced in such cases into a supply line in the plant for producing direct-reduced metal ores or iron and used in the respective reduction unit such as for example fluidized bed reactor system, reduction bed furnace such as e.g. MIDREX® reduction bed, etc.). During introduction the supplied export gas can mix with the recycle gas of the plant for producing direct-reduced metal ores, wherein the supply line for the export gas usually emerges in front of the device for separation of gas mixtures into a line for the recycle gas of the plant for producing direct-reduced metal ores.

For optimum functioning of the reduction process in the plant for producing direct-reduced metal ores or iron however a $CO_2$ removal which functions well in the device for separation of gas mixtures from the process gas—i.e. a mixture of recycle gas of the plant and supplied export gas—is necessary. Therefore the input pressure for the device for separation of gas mixtures is usually increased with the aid of the associated compressing device (e.g. one or more compressors). The input pressure at the device for separation of gas mixtures should usually lie at a constant input pressure of around 3 to 8 bar excess pressure, in order to guarantee an efficient and economic full $CO_2$ removal from the process gases. Thus for example at least around 6 bar excess pressure is needed for $CO_2$ removal by a PSA and at least around 3 bar excess pressure by a VPSA.

However the reduction unit used requires a significantly lower operating pressure. Thus a MIDREX® reduction shaft as the reduction unit for example only needs an input pressure of around 1.2 to 1.5 bar. Thus a pressure difference is produced by on the one hand the relatively high operating pressure of the device for separation of gas mixtures, especially when a PSA plant is used, and on the other hand the relatively low operating pressure of the reduction unit, which must be reduced for an optimal functioning of the system for production of direct-reduced metal ores.

Usually this pressure difference is reduced by a system of regulation valves, which is especially fitted between the device for separation of gas mixtures and the reduction unit or a gas heating device connected upstream of the reduction unit. However a reduction in the pressure difference using regulation valves has the disadvantage that this pressure difference remains unused or that—especially for the input pressure level at the device for separation of gas mixtures—energy must be expended, which will be destroyed unused thereafter. Thus for example when a device for pressure swing absorption (PSA) or a device for vacuum pressure swing absorption (VPSA) and a MIDREX® reduction shaft are used as the reduction unit, because of the necessary operating pressure, approximately 1 to 6 bar is destroyed unused. Thus the specific energy or power consumption of a combined cycle plant is relatively high and thus reduces its cost effectiveness. Noise generated by the valve station is also relatively high.

Furthermore the export gas, which is introduced at least partly as process gas into the plant for producing direct-reduced metal ores, can originate from for example from two plants for production of pig iron or melt reduction plants, which for example have different pressure levels at the respective transition point. This can be caused for example by different system pressure requirements at the respective melter gasifier. In order to obtain an approximately constant input pressure level for the reduction unit or the device for separation of gas mixtures, a bypass volume pressure regulation can be provided in these types of combined-cycle plants. This has the disadvantage however that approximately 10 to 20% of the export gas for use in the combined-cycle plant, especially in the plant for producing direct-reduced metal ores, is lost, whereby the productivity and the cost effectiveness of the plant is likewise reduced.

SUMMARY OF THE INVENTION

The underlying object of the invention is thus to specify a system through which unused pressure differences can be sensibly used and losses of export gas can be avoided and also the cost effectiveness of a plant for producing direct-reduced metal ores will be increased.

This object is achieved by a system of the type specified at the start, whereby a turbine, especially an expansion turbine, is fitted between the device for separation of gas mixtures and the gas heating device connected upstream from the reduction unit, such that a drop in pressure between the device for separation of gas mixtures and the reduction unit is able to be converted into usable forms of energy for operation of further components of the plant for producing direct-reduced metal ores.

The main aspect of the inventively proposed solution consists of enabling an existing drop in pressure (e.g. of approximately 1 to 6 bar excess pressure) to be used cost-effectively by adding a turbine, especially an expansion turbine, through which the process gas flows during the transfer from the device for separation of gas mixtures to the reduction unit. Through the turbine the drop in pressure is converted in a simple manner into other forms of energy (e.g. electrical energy, mechanical energy etc.) which are able to be used in an ideal manner in the plant for producing direct-reduced metal ores, even e.g. for operation of further components. In particular an expansion turbine is used as the turbine. An expansion turbine is a gas turbine in which a gas under pressure expands while discharging work or energy, wherein the expanding gas is not created in the turbine itself but occurs in preceding processes.

The use of such a turbine enables the energy which is stored in the drop in pressure existing between the device for separation of gas mixtures and the reduction unit to be converted and made usable very simply. Thus the energy which is supplied during the compressing of the process gases by the compressing device associated with the device for separation of gas mixtures, is recovered again in a simple manner at least partly. Through this process the cost effectiveness of the plant for producing direct-reduced metal ores or a combined-cycle plant is increased.

Since the process gases, after treatment in the device for separation of gas mixtures, especially after treatment in a PSA or VPSA, are very dry or have a very low water content (the dew point lies at around −110° C.), problems with condensation because of cooling of the process gases during the expansion in the turbine hardly arise. Furthermore a high percentage of corrosive and/or tarry components from the process gases (such as e.g. H2S, PAK, etc.) (e.g. 99% for H2S) produced by the device for separation of gas mixtures are usually eliminated by the adsorption device. This also keeps faults/damage in the turbine which might be caused by corrosion, caking and/or abrasion, very low.

In a further embodiment of the inventive system there is provision, for a preheating of the process gases before a transfer to the gas heating device which is connected upstream of the reduction unit, for a gas heat exchanger to be fitted such that heat from the process gases introduced into the device for separation of gas mixtures, especially the so-called export gas, will be output to the process gases transferred to the reduction unit. In this way, on the one hand the process gases—especially the export gas originating from a plant for producing pig iron—are cooled before being introduced into the device for separation of gas mixtures or into the associated compressing device. On the other hand the heat given off is used in an ideal manner in order to preheat the cooled process gases, which after the device for separation of gas mixtures for example, have a temperature of around 30 to 50° C. or which are cooled further by the expansion in the turbine to e.g. around 10 to −20° C. This additionally enables energy to be saved during the heating up of the process gases by the gas heating device connected upstream from the reduction unit.

The gas heat exchanger can advantageously be provided between the device for separation of gas mixtures and the turbine or expansion turbine. A gas heat exchanger connected downstream of the device for separation of gas mixtures and upstream of the turbine has the advantage that the heat given off before the device for separation of gas mixtures by the process gas, in particular export gas, can be additionally used for energy recovery in the turbine.

As an alternative it can also be useful for the gas heat exchanger to be connected upstream of the gas heating device connected upstream of the reduction unit and thus to be connected downstream of the turbine. This means that less energy has to be expended for the heating up of the process gases after the turbine in the gas heating device, since in an ideal manner the heat already given off by the process gases before their introduction into the device for separation of gas mixtures cooling purposes in the gas heat exchanger can be used for for part heating of the gases conveyed to the reduction unit.

The energy for preheating the gas from the device for separation of gas mixtures, known as the product gas, can for example originate from the following waste heat sources:
- Flue gas of the heating device for reduction gas (e.g. reduction gas furnace)
- So-called top gas from the reduction unit
- Cooling gas, which is used for cooling the hot reduced material in the reduction unit or in a downstream cooling device
- Waste heat from an upstream iron production process (e.g. top gas, off gas, generator gas, etc.)

It is also advantageous for the turbine to additionally be used for regulation of the process gas volume or process gas volume flow from the device for separation of gas mixtures to the reduction unit and/or to be configured for regulation of an outlet pressure after the device for separation of gas mixtures. Through such regulations (e.g. of the process gas volume and/or of the outlet pressure) by the turbine it is ensured in a simple manner inter alia that a maximum capacity of the device for separation of gas mixtures—especially of a PSA or VPSA—is not exceeded. This can be guaranteed for example by monitoring the feed gas flow to the device for separation of gas mixtures, especially PSA, and/or the outlet pressure. Exceeding this maximum capacity could otherwise lead to damage to the device for separation of gas mixtures and/or to a hydraulic overload.

In addition an almost constant volume of process gases, especially reduction gas, is required in the reduction unit. This almost constant gas volume or a ratio of volume of reduction gas to direct-reduced material (metal, iron (DRI), etc.) determines in such cases the product quality of the direct-reduced metal or sponge iron for example. Therefore, depending on desired product quality, a specifically selected, almost constant volume of reduction gas is necessary in the reduction unit. This can likewise be achieved by the regulation of the process gas volume or the process gas volume flow with the aid of the turbine.

It is of advantage in this case if, for the regulation of the process gas volume or the process gas volume flow, the turbine either has what is known as an introduction facility or a facility for control of valves, through which the process gas flow from the device for separation of gas mixtures to the reduction unit is controlled or regulated in a simple and cost-effective manner.

It is further useful for a generator, which is driven by the turbine or the expansion turbine, to be provided for the conversion of the drop in pressure between the device for separation of gas mixtures and the reduction unit into electrical energy. The coupling of the turbine with a generator converts the drop in pressure into electrical energy in a simple manner and can thus be used for operation of further components of the plant for producing direct-reduced metal ores (e.g. compressors etc.). Power consumption or electricity costs of the plant are thus reduced in an ideal manner.

In a preferred embodiment of the inventive system there can be provision, for a conversion of the drop in pressure between the device for separation of gas mixtures and the reduction unit into mechanical energy, for the turbine to be coupled to further components of the plant for production of direct-reduced metal ores, especially compressing devices such as compressors for example, cooling gas compressors of the plant and in an especially preferred way with the recycle gas compressors. Through this coupling, in which the energy is able to be transmitted directly from the turbine to one or more components of the plant for producing direct-reduced metal ores, use of a generator and the costs arising for said use can additionally be saved.

It is also advantageous, for starting up/shutting down and/or for a part load operation of the plant for producing direct-reduced metal ores, for a bypass line—with for example regulation valves and/or flaps—to be provided around the turbine or expansion turbine. In this way, even during starting up or shutting down of the plant or during part-load operation, constant pressure and process gas volume conditions can be ensured in the plant for producing direct-reduced metal ores.

BRIEF DESCRIPTION OF THE DRAWING

The invention will be explained below by way of example with reference to the enclosed figures, in which.

IMPLEMENTATION OF THE INVENTION

Figure 1:
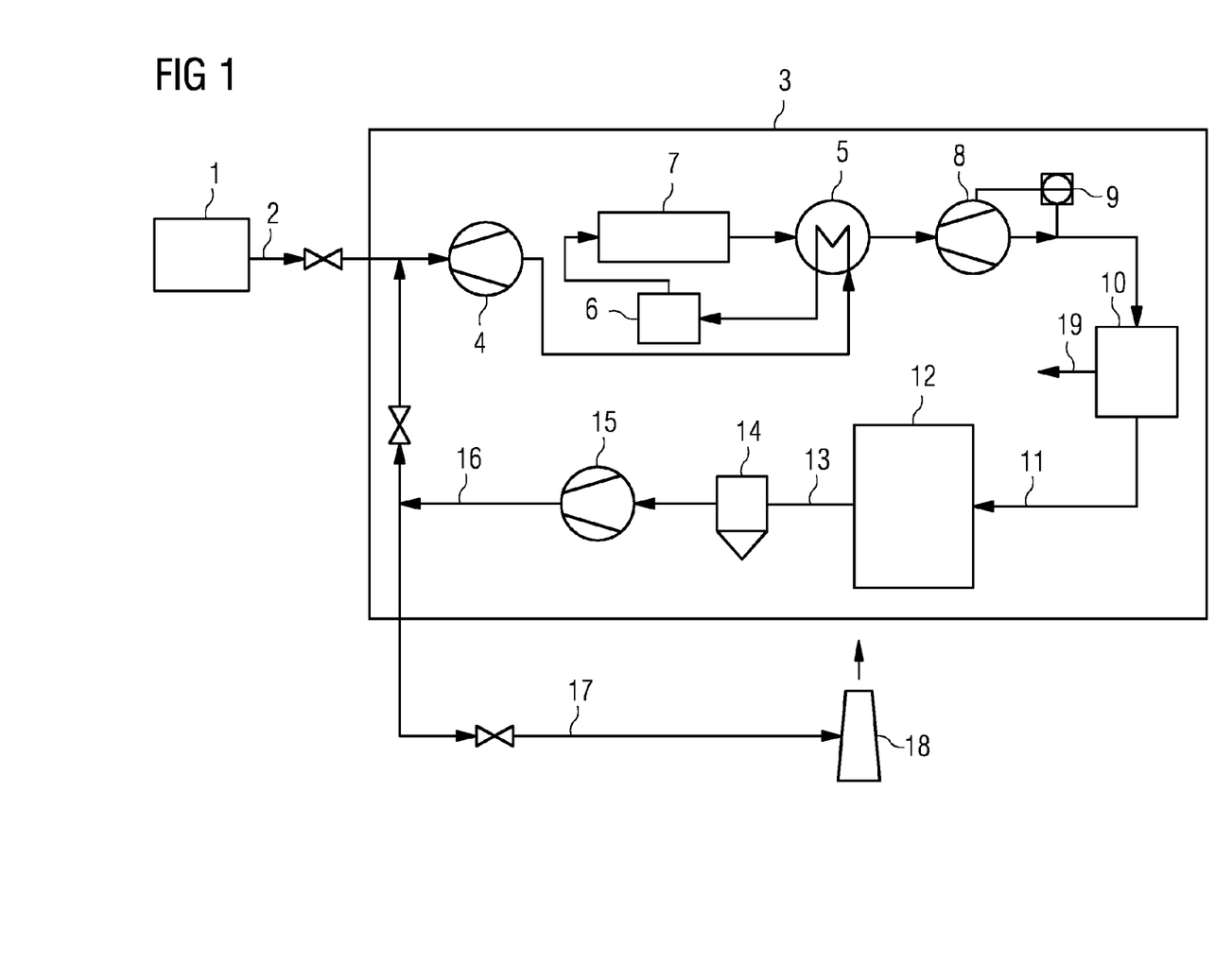
FIG. 1 shows a schematic example of a structure of the inventive system for energy optimization in a plant for producing direct-reduced metal ores or in a combined-cycle plant

FIG. 1 shows a schematic example of a structure of a plant for producing direct-reduced metal ores 3, especially iron, which includes the inventive system for energy optimization. Process gases 2, 11, 16 of the schematically depicted example plant 3 for producing direct-reduced metal ores are tapped off from a plant for pig iron production 1, especially a melt reduction plant-based for example on the COREX®- or FINEX® process. Such a plant is also referred to as a combined-cycle plant.

In a combined-cycle plant an export gas 2 of the plant for pig iron production 1 is usually used as a reduction gas 11 for a reduction of metal ores, iron ore etc. in a plant for producing direct-reduced metal ores 3, iron etc. The export gas 2 arises in the plant for pig iron production 1 for example during a melt reduction process such as e.g. the COREX® process or the FINEX® process, wherein in the COREX® process metal ore in lump form (e.g. lump ore, pellet, etc.) is used, while in the FINEX® process the metal ore is introduced as fine ore.

The export gas 2 arrives as process gas via a feed line in the plant for producing direct-reduced metal ores 3. In this case the feed line for the export gas 2 emerges into a return line in which the so-called top gas or recycle gas 16 of the plant 3 is again prepared for a reduction process and fed back.

The export gas 2 and the recycle gas 16 are fed to a compressing device 4 (e.g. compressor), which is assigned to a downstream device for separation of gas mixtures 7. A usually constant pressure level necessary for the device for separation of gas mixtures 7 (e.g. of appr. 3 to 8 bar excess pressure) is established with the compressing device 4. In this case it should be additionally noted that a pressure difference exists between the export gas 2 and the recycle gas 11. Since the export gas 2 fluctuates in its volume (e.g. by 10%), the volume of recycle gas 16 will usually be varied via an outlet pressure regulation. The recycle gas 16 not necessary for a pressure and volume regulation can for example be tapped off via an exhaust line 17 as so-called DR export gas of the plant 3 and e.g. recycled thermally (e.g. consumers in the steelworks such as e.g. roller-hearth furnace, slab pusher furnace, etc.) or blown out via a waste gas disposal device 18 (e.g. flare). This exhaust line 17 likewise has a valve for pressure control.

After the compressor 4 the process gas 2 is cooled to a temperature (e.g. appr. 30 to 50° C.) necessary for treatment in the device for separation of gas mixtures 7. Cooling is necessary since the export gas 2 from the plant for pig iron production has a temperature of around 100 to 120° after its compression. The process gas 2 is therefore routed after the compressing device 4 through a gas heat exchanger 5, which simultaneously serves to preheat the process gas 2 largely freed from CO2 and/or water vapor before the expansion device 8. For further cooling the process gas 2 is also conveyed through a further cooling device 6 before the device for separation of gas mixtures 7. A heat exchanger with cooling water can for example be provided as the cooling device 6.

After sufficient cooling to appr. 30 to 50° C., the process gas 2 will be fed to the device for separation of gas mixtures 7 for CO2 removal. With a sufficiently high pressure level this device 7 can for example be embodied as a device for Pressure Swing Adsorption (PSA) 7 or as a so-called Vacuum Pressure Swing Adsorption device (VPSA) 7.

Then the process gas 2, largely freed of CO2 and/or water vapor, which as result of the treatment in the device for separation of gas mixtures 7 is usually very dry—i.e. has a very low water content, and which for example also has a very low percentage of corrosive and tarry gas components, is conveyed for preheating through the gas heat exchanger 5. From there the process gas flows to a turbine 8 or expansion turbine 8. In this turbine 8 a drop in pressure is reduced or converted into other usable forms of energy.

A reduction of the drop in pressure is necessary, since for an efficient and cost-effective CO2 removal from the process gas 2 at the device for separation of gas mixtures 7, an input pressure level of appr. 3 to 8 bar excess pressure is usually needed. Thus for example an excess pressure of at least 6 bar is needed by a PSA and an excess pressure of at least appr. 3 bar by a VPSA. The reduction unit 12 however requires a significantly lower operating pressure (e.g. for a MIDREX® reduction shaft appr. 1.2 to 1.5 bar excess pressure). Thus the relatively high operating pressure of the device for separation of gas mixtures 7, especially when a PSA is used, on the one hand and on the other hand the relatively low operating pressure of the reduction unit 12 results in a pressure difference, which must be reduced for optimum functioning of the plant for producing direct-reduced metal ores 3. In the turbine 8 this pressure drop is therefore reduced and converted into a form of energy usable for the plant 3.

For the conversion or use of the energy the turbine 8 can be coupled to a generator, through which the energy stored in the drop in pressure is converted into electrical energy. This electrical energy can then be used for operation of further components, such as for example the compressors 4, 15 of the plant for producing direct-reduced metal ores 3. As an alternative the turbine 8 can be provided directly with a mechanical coupling to further components, especially the compressors 4, 15, in order to use the energy stored in the drop in pressure as mechanical energy.

The turbine 8 also has a device for regulating the process gas volume 9 or for regulating a pressure after the device for separation of gas mixtures 7, so that the maximum capacity of the device for separation of gas mixtures 7 is not exceeded or no damage is done to said device. Either an introduction facility or a device for control of valves can be provided as the device for regulating the process volume 9.

The process gas 2 cooled down further by the expansion in the turbine 8, with a temperature of e.g. appr. 10 to −20° C., is then transferred to a heating device 10. As an alternative the gas heat exchanger 5 can also be fitted instead between the device for separation of gas mixtures 7 and the turbine 8 after the turbine 8 and before the heating device 10.

The energy for preheating the process gas 2 which is transferred from the device for separation of gas mixtures 7 in the gas heat exchanger 5 can for example be obtained from a waste heat source such as for instance a flue gas 19 of the heating device 10 (e.g. reduction gas furnace), a top gas 13 from the reduction unit 12, a cooling gas for cooling the hot reduced material in the reduction unit 12 or in a downstream cooling device or from waste heat from an upstream iron production process (e.g. top gas, off gas, generator gas, etc.).

In the heating device 10 the process gas 2 or a gas mixture together with the recycle gas 16 is then heated for the reduction process and supplied as reduction gas 11 to the reduction unit 12. Then the reduction gas 11 is introduced into the reduction unit 12, in which the material to be reduced supplied via a material feed—e.g. metal ore, iron ore, etc. is located, in order to reduce this material in the countercurrent. Depending on the available material to be reduced (ore in lump form, pellet, fine ore etc.), a packed bed reduction shaft such as MIDREX® reduction shaft or a fluidized bed reactor system can be used as the reduction unit 12.

The reduction gas 11 is then taken away from the upper part of the reduction unit 12 as off gas or as top gas 13 and cooled down. A gas cleaning device 14 connected downstream from the reduction unit 12 is provided for the cleaning of the gas 13. After the gas cleaning device 14 a compressing device 15 is provided. The cleaned recycle gas 16 is then fed back to the reduction process via the return line.

FIG. 2 again shows a schematic example of the plant for producing direct-reduced metal ores 3. In this case however export gas 2a, 2b is obtained from two plants for pig iron production 1a, 1b. For the sake of simplicity the components of the plant 3 shown in FIG. 2 which have the same function are labeled with the same reference characters. Since the plants for pig iron production 1a, 1b can however have a different pressure level at the transfer point of the respective export gas 2a, 2b, components, such as the device for separation of gas mixtures 7a, 7b for example, can be provided with an associated compressing device 4a, 4b, the gas heat exchanger 5a, 5b, the turbine 8a, 8b, etc. for the respective pressure level.

Figure 2:
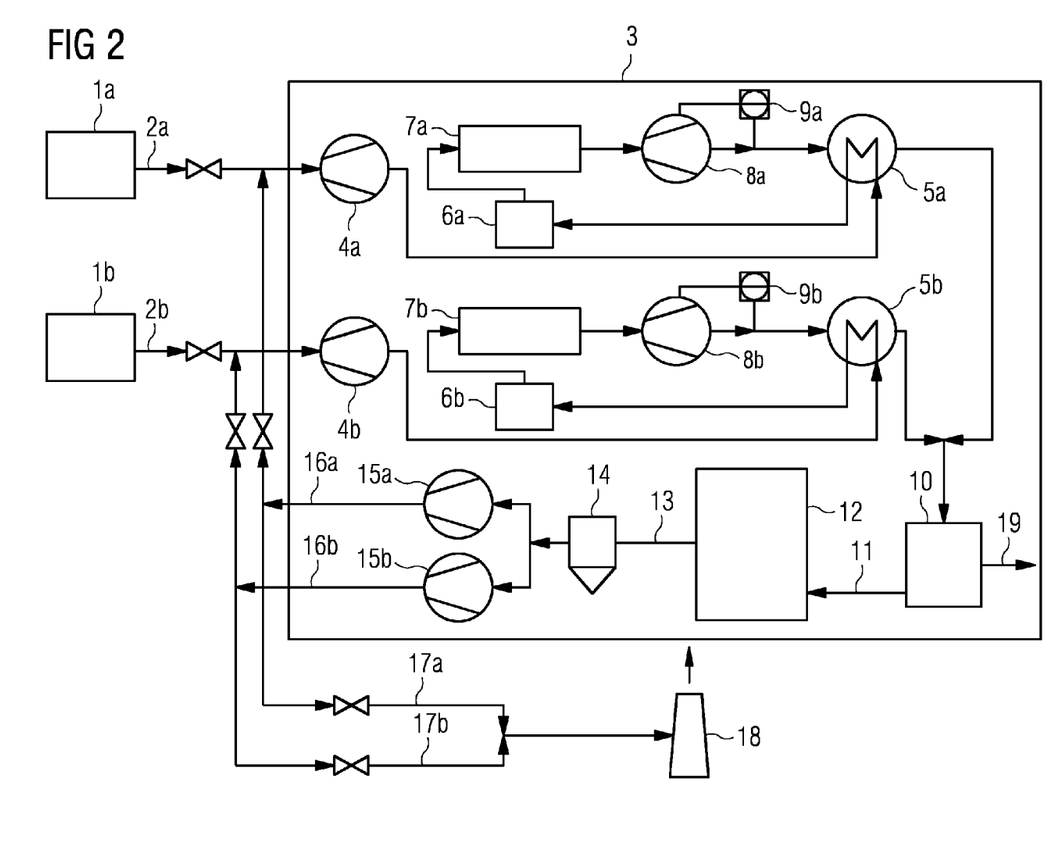
FIG. 2 shows a schematic diagram with an example of the inventive system for energy optimization during supply of export gas from two plants for pig iron production

In this case the export gas 2a is supplied from the first plant for pig iron production 1a via a first branch with compressing device 4a, gas heat exchanger 5a and additional cooling device 6a, to a first device for separation of gas mixtures 7a. The existing pressure drop to the reduction unit 12 is then fed via a first turbine 8a with a device for regulating the respective process volume 9a through the gas heat exchanger 5a for preheating to the heating device 10 and thus to the reduction unit 12.

The export gas 2b from a second plant for pig iron production 2b is likewise conveyed via a second parallel branch, which likewise has a compressing device 4b, a gas heat exchanger 5b and an additional cooling device 6b, to a second device for separation of gas mixtures 7b. The drop in pressure to the reduction unit 12 existing in the second branch is likewise reduced by a second turbine 8b with a device for regulating the respective process gas volume 9b or is converted into a usable form of energy. The process gas in the second branch is then likewise conveyed for preheating by the gas heat exchanger 5b of the second branch onto the heating device 10 and to the reduction unit 12.

Alternatively in the two branches—as shown in FIG. 1—the respective gas heat exchanger 5a, 5b can also be arranged after the respective device for separation of gas mixtures 7a, 7b and before the respective turbine 8a, 8b. The respective export gas pressure at the two transfer points is regulated by two parallel compressing devices 15a, 15b for the recycle gas 16a, 16b. Different exit pressures can then be set via these compressing devices 15a, 15b. Surplus recycle gas 16a, 16b not needed for a pressure and volume regulation can for example be taken away by exhaust lines 17a, 17b as so-called DR export gas to the plant for producing direct-reduced metal ores 3 and e.g. thermally recycled or blown out by the waste gas disposal device 18.

Figure 3:
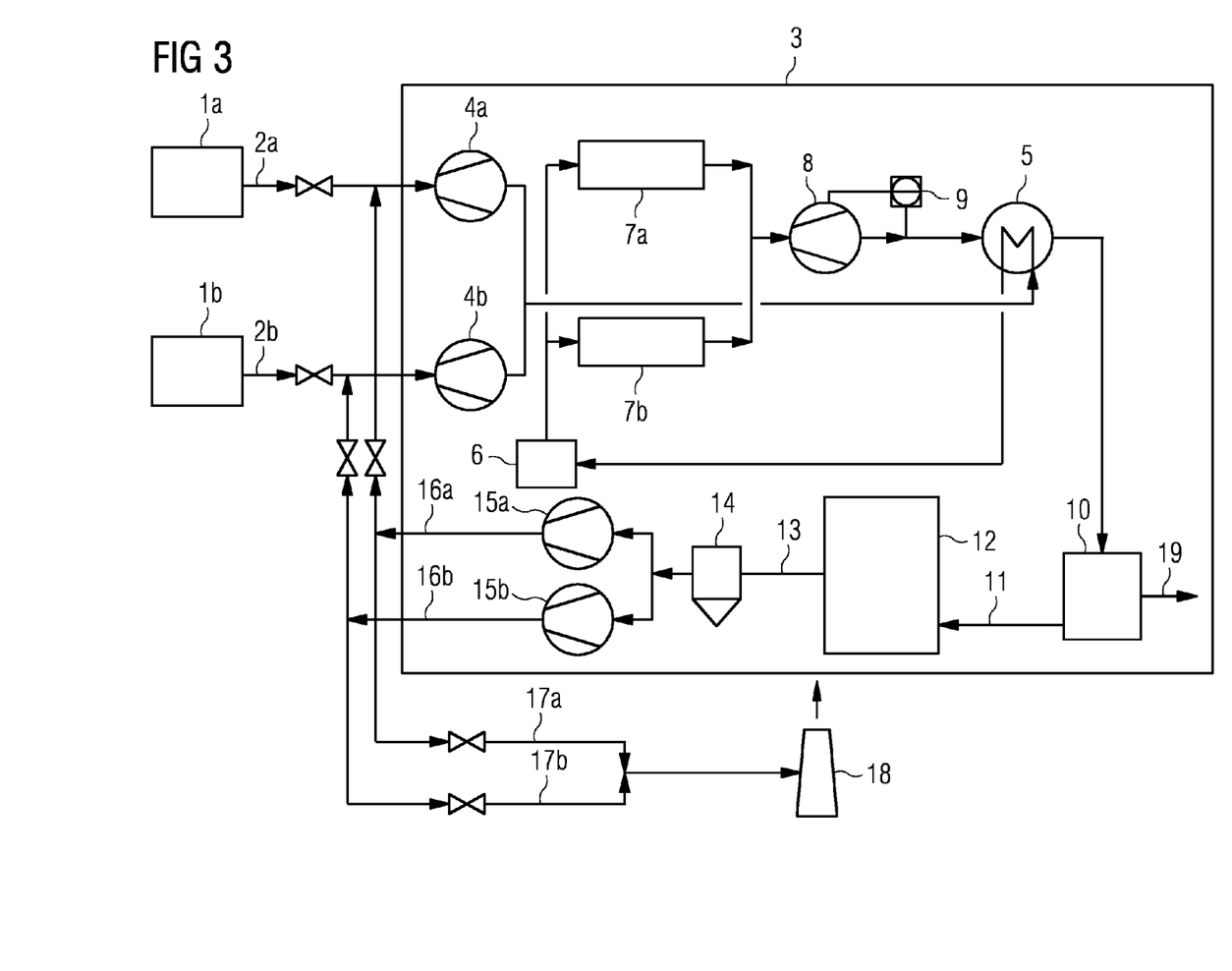
FIG. 3 shows a schematic example of a further variant of the inventive system for energy optimization during supply of export gas from two plants for pig iron production

FIG. 3 likewise shows a schematic example for producing direct-reduced metal ores 3, in which export gas 2a, 2b is obtained from two plants for pig iron production 1a, 1b. For the sake of simplicity, in the plant 3 depicted in FIG. 3, those components which have the same function as the components in FIG. 1 or 2 are likewise labeled with the same reference characters as in FIGS. 1 and 2. Since the plants for pig iron production 1a, 1b have a different pressure level at the transfer point of the respective export gas 2a, 2b, in the plant for producing direct-reduced metal ores 3 shown in FIG. 3 components such as for example the device for separation of gas mixtures 7a, 7b are again provided with a corresponding compressing device 4a, 4b for the respective pressure level.

In this case the export gas 2a is again routed from a first plant for pig iron production 1a via a first branch to a first compressing device 4a and the export gas 2b is routed from the second plant for pig iron production 1b via a second branch to a second compressing device 4b. The two branches are then merged and the export gas 2a, 2b is conveyed jointly to a gas heat exchanger 5 and an additional cooling device 6. The different export gas pressure at the transfer point is regulated for the plant 3 depicted in FIG. 3 for example via the two parallel compressing devices 4a, 4b.

After the additional cooling device 6, two devices for the separation of gas mixtures 7a, 7b arranged in parallel in each case can be provided for a removal of CO2 and/or water vapor from the process gas. The process gas largely freed from CO2 and/or water vapor is then merged again after the devices for separation of gas mixtures 7a, 7b and conveyed onwards to the turbine 8 with the device for regulating the process gas volume 9, in order to reduce the pressure drop. From there the process gas flows as reduction gas 11 via the heating facility 10 from which for example the flue gas 19 for preheating the process gas can be obtained or used, to the reduction unit 12.

After the reduction unit 12 the reduction gas 11 is tapped off as so-called off gas or top gas 13, cooled and cleaned in a gas cleaning device 14. After the gas cleaning device 14, for each plant for pig iron production 1a, 1b from which export gas 2a, 2b is obtained, a compressing device 15a, 15b and return lines for the respective recycle gas 16a, 16b are provided in each case. In such cases different exit pressures can again be set via the compressing devices 15a, 15b. Surplus recycle gas 16a, 16b not needed for a pressure and volume regulation, can for example be taken away by exhaust lines 17a, 17b as so-called DR export gas of the plant for producing direct-reduced metal ores 3 and thermally recycled or expelled via the waste gas disposal device 18 for example.

With the variant of the plant for producing direct-reduced metal ores 3 shown in FIG. 3 the gas heat exchanger 5—as shown in FIG. 1—can also be arranged as an alternative after the parallel devices for separation of gas mixtures 7a, 7b and before the turbine 8.

The use of turbine 8 or expansion turbine 8 in the plant for producing direct-reduced metal ores 3, depending on the size of the plant, enables electrical energy of appr. 2 to 6 MWh/h to be recovered or saved. This enables the energy consumption of such plants 3 to be significantly reduced and operating costs to be lowered. In addition the use of the turbine 8 also produces a reduction in the CO2 emission of the plant 3 since a smaller amount of electrical energy is necessary for the operation of the plant 3.

LIST OF REFERENCE CHARACTERS 1, 1a, 1b System for pig iron production, especially melt reduction plant
2, 2a, 2b Export gas of the plant for pig iron production Plant for producing direct-reduced metal ores or iron (DR plant)
4, 4a, 4b Compressing device for device for separation of gas mixtures (e.g. compressor)
5, 5a, 5b Gas heat exchanger
6, 6a, 6b Cooling device (e.g. heat exchanger)
7, 7a, 7b Device for separation of gas mixtures—CO2 removal
8, 8a, 8b Expansion turbine
9, 9a, 9b Device for regulating the process volume Heating device for reduction gas (e.g. reduction gas furnace)
11 Reduction gas
12 Reduction unit
13 Top gas or top gas line
14 Gas cleaning device for top gas
15, 15a, 15b Compressing device for recycle gas (e.g. compressor)
16, 16a, 16b Recycle gas or recycle gas line
17, 17a, 17b Exhaust line for surplus process gases
18 Waste gas disposal device (e.g. flare)
19 Flue gas from heating device for reduction gas (e.g. reduction gas furnace)

The invention claimed is:

1. A system for energy optimization in a plant for producing direct-reduced metal ores, comprising:
   at least one reduction unit, a gas separation device for separation of gas mixtures, a gas heating device connected upstream of the reduction unit and downstream of the gas separation device in a direction of gas flow;
   a supply line for feeding process gas from at least one plant for pig iron production and toward the reduction unit;
   an expansion turbine fitted between the gas separation device and the gas heating device and connected upstream of the reduction unit, the turbine is configured such that a drop in pressure between the gas separation device and the reduction unit is able to be converted into forms of energy usable for operation of further components of the plant for producing direct-reduced metal ores; and
   the turbine is configured for regulating a volume of process gas flowing from the gas separation device to the reduction unit and/or for regulating pressure of the process gas exiting the gas separation device for separation of gas mixtures.

2. The system as claimed in claim 1, further comprising, a gas heat exchanger fitted such that heat given off by the process gas is introduced into the gas separation device, the gas heat exchanger is configured for preheating the process gas before they are conveyed to the gas heating device connected upstream of the reduction unit.

3. The system as claimed in claim 2, wherein the gas heat exchanger is connected downstream of the gas separation device and upstream of the expansion turbine.

4. The system as claimed in claim 2, wherein the gas heat exchanger is connected downstream of the expansion turbine and upstream of the gas heating device connected upstream of the reduction unit.

5. The system as claimed in claim 1, wherein the turbine has introduction facilities for regulation of volume of the process gas.

6. The system as claimed in claim 1, further comprising valves downstream of the expansion turbine; and the turbine has a facility for control of the valves for the regulation of the volume of process gas.

7. The system as claimed in claim 1, further comprising a generator configured and connected for converting the drop in pressure between the gas separation device and the reduction unit into electrical energy.

8. The system as claimed in claim 1, further comprising a mechanical coupling of the turbine to compressing devices of the plant for producing direct-reduced metal ores and the compressing devices are configured for converting the drop in pressure between the gas separation device and the reduction unit into mechanical energy.

9. The system as claimed in claim 1, further comprising a bypass line around the turbine for use during a start-up, shutdown and/or part load operation of the plant for producing direct-reduced metal ores.

* * * * *